(12) United States Patent
Sorrentino et al.

(10) Patent No.: US 9,497,709 B2
(45) Date of Patent: Nov. 15, 2016

(54) METHOD AND APPARATUS FOR UPLINK POWER CONTROL IN A WIRELESS COMMUNICATION NETWORK

(71) Applicant: Telefonaktiebolaget L M Ericsson (publ), Stockholm (SE)

(72) Inventors: Stefano Sorrentino, Solna (SE); Aram Antó, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 587 days.

(21) Appl. No.: 13/818,438

(22) PCT Filed: Jan. 21, 2013

(86) PCT No.: PCT/SE2013/050036
§ 371 (c)(1),
(2) Date: Feb. 22, 2013

(87) PCT Pub. No.: WO2013/119166
PCT Pub. Date: Aug. 15, 2013

(65) Prior Publication Data
US 2014/0071902 A1    Mar. 13, 2014

Related U.S. Application Data

(60) Provisional application No. 61/596,338, filed on Feb. 8, 2012, provisional application No. 61/616,806, filed on Mar. 28, 2012.

(51) Int. Cl.
*H04W 52/54* (2009.01)
*H04W 52/18* (2009.01)
(Continued)

(52) U.S. Cl.
CPC ........... *H04W 52/18* (2013.01); *H04W 52/325* (2013.01); *H04W 52/54* (2013.01); *H04W 52/146* (2013.01); *H04W 52/244* (2013.01)

(58) Field of Classification Search
CPC .............................. H04W 52/04; H04W 52/18
(Continued)

(56) References Cited

U.S. PATENT DOCUMENTS

2003/0016652 A1    1/2003   Ma et al.
2011/0038271 A1*   2/2011   Shin .................... H04W 52/146
                                                                     370/252
(Continued)

FOREIGN PATENT DOCUMENTS

WO    2011078631 A2    6/2011
WO    2011155711 A2    12/2011
(Continued)

OTHER PUBLICATIONS

3rd Generation Partnership Project. "Aspects on Distributed RRUs with Shared Cell-ID for Heterogeneous Deployments." 3GPP TSG-RAN WG1 #64, R1-110649, Feb. 21-25, 2011, Taipei, Taiwan.
(Continued)

*Primary Examiner* — Hassan Kizou
*Assistant Examiner* — Abdullahi Ahmed
(74) *Attorney, Agent, or Firm* — Murphy, Bilak & Homiller, PLLC

(57) ABSTRACT

According to the teachings herein, an LTE or other wireless communication network provides for independent control of SRS transmissions by a UE or other wireless device. The network advantageously sends DCI messages for SRS power control using a modified format 3/3A, where the message length conforms to that used for conventional format 3/3A messages but where the message is masked using a distinct RNTI. Correspondingly, the wireless device is configured to recognize from the distinct RNTI that the received TPC commands are targeted to controlling the
(Continued)

uplink transmit power used by the wireless device for SRS transmissions.

20 Claims, 6 Drawing Sheets

(51) Int. Cl.
*H04W 52/32* (2009.01)
*H04W 52/14* (2009.01)
*H04W 52/24* (2009.01)

(58) Field of Classification Search
USPC .................................................. 370/328, 329
See application file for complete search history.

(56) References Cited

U.S. PATENT DOCUMENTS

| | | | |
|---|---|---|---|
| 2011/0250899 A1* | 10/2011 | Vajapeyam et al. | 455/450 |
| 2011/0310818 A1* | 12/2011 | Lin | H04W 72/042 370/329 |
| 2012/0129566 A1* | 5/2012 | Lee et al. | 455/522 |
| 2012/0208583 A1 | 8/2012 | Chung et al. | |
| 2013/0077571 A1* | 3/2013 | Papasakellariou et al. | 370/328 |
| 2014/0022961 A1* | 1/2014 | Park et al. | 370/280 |
| 2014/0056278 A1* | 2/2014 | Marinier et al. | 370/330 |
| 2014/0321406 A1* | 10/2014 | Marinier et al. | 370/329 |

FOREIGN PATENT DOCUMENTS

| | | |
|---|---|---|
| WO | 2011162661 A1 | 12/2011 |
| WO | 2012176154 A1 | 12/2012 |
| WO | 2012177207 A1 | 12/2012 |
| WO | 2013025144 A1 | 2/2013 |

OTHER PUBLICATIONS

3rd Generation Partnership Project. "Corrections to Rel-10 LTE-Advanced features in 36.213." 3GPP TSG-RAN Meeting #64, R1-111216, Feb. 21-25, 2011, Taipei, Taiwan.

3rd Generation Partnership Project. 3GPP TS 36.212 V10.4.0 (Dec. 2011). 3rd Generation Partnership Project;Technical Specification Group Radio Access Network; Evolved Universal Terrestrial Radio Access (E-UTRA); Multiplexing and channel coding (Release 10). Dec. 2012.

3rd Generation Partnership Project. "Enhancements for Uplink Power Control." 3GPP TSG RAN WG1 Meeting #67, R1-114393, Nov. 14-18, 2011, San Francisco, USA.

3rd Generation Partnership Project. 3GPP TS 36.213 V10.4.0 (Dec. 2011). 3rd Generation Partnership Project; Technical Specification Group Radio Access Network; Evolved Universal Terrestrial Radio Access (E-UTRA); Physical layer procedures (Release 10). Dec. 2011.

3rd Generation Partnership Project. 3GPP TS 36.211 V10.2.0 (Jun. 2011). 3rd Generation Partnership Project; Technical Specification Group Radio Access Network; Evolved Universal Terrestrial Radio Access (E-UTRA); Physical Channels and Modulation (Release 10). Jun. 2011.

3rd Generation Partnership Project. 3GPP TS 36.212 V10.1.0 (Mar. 2011). 3rd Generation Partnership Project;Technical Specification Group Radio Access Network; Evolved Universal Terrestrial Radio Access (E-UTRA); Multiplexing and channel coding (Release 10). Mar. 2011.

3rd Generation Partnership Project. 3GPP TS 36.213 V10.1.0 (Mar. 2011). 3rd Generation Partnership Project; Technical Specification Group Radio Access Network; Evolved Universal Terrestrial Radio Access (E-UTRA); Physical layer procedures (Release 10). Mar. 2011.

3rd Generation Partnership Project. "SRS Transmission Power Control." 3GPP TSG RAN WG1 #68, R1-120180_R1-120183, Feb. 6-10, 2012, pp. 1-3, Dresden, Germany.

3rd Generation Partnership Project. 3GPP TS 36.213 V11.2.0 (Feb. 2013). 3rd Generation Partnership Project; Technical Specification Group Radio Access Network; Evolved Universal Terrestrial Radio Access (E-UTRA); Physical layer procedures (Release 11), Feb. 2013, pp. 1-170.

3rd Generation Partnership Project. 3GPP TS 36.212 V11.2.0 (Feb. 2013). 3rd Generation Partnership Project; Technical Specification Group Radio Access Network; Evolved Universal Terrestrial Radio Access (E-UTRA); Multiplexing and channel coding (Release 11), Feb. 2013, pp. 1-82.

* cited by examiner

METHOD AND APPARATUS FOR UPLINK POWER CONTROL IN A WIRELESS COMMUNICATION NETWORK

RELATED APPLICATIONS

This application claims priority from the U.S. provisional patent application filed on 8 Feb. 2012 and assigned App. No. 61/596,338, and which application is incorporated by reference herein.

BACKGROUND

The Long Term Evolution, "LTE", standard uses Radio Network Temporary Identifiers or "RNTIs" to identify individual and/or groups of user equipments, "UEs". A given UE may have multiple RNTIs active at any given time, e.g., for use in paging, random access, and uplink transmit power control.

In the case of uplink transmit power control, a network base station, referred to as an "eNodeB" in the LTE standard, sends Downlink Control Information or "DCI" messages that carry transmit power control, "TPC", commands. For example, so called Format 3/3A messages are used to convey TPC commands for Physical Uplink Control Channel, "PUCCH", transmissions by a UE, as well as TPC commands for Physical Uplink Shared Channel, "PUSCH", transmissions by the UE. Different RNTIs are used to indicate whether the TPCs pertain to PUCCH or PUSCH power control.

Within this framework, the UE ties its transmit power control of uplink Sounding Reference Signal, "SRS", transmissions to the TPC commands received for its PUSCH transmissions. In other words, LTE provides no mechanism for separately controlling the uplink transmit power of the SRS transmissions by a UE. Thus, SRS power control at the UE is made to depend on the network's closed-loop control of the UE's PUSCH transmit power, although the reception quality requirements and network reception points for PUSCH and SRS transmissions generally are different. These differences become particularly problematic in heterogeneous network environments where smaller cells associated with low-power access nodes overlay a larger, macro cell provided by an eNodeB or other relatively high-power access point.

SUMMARY

According to the teachings herein, an LTE or other wireless communication network provides for independent control of SRS transmissions by a UE or other wireless device. The network advantageously sends DCI messages for SRS power control using a modified format 3/3A, where the message length conforms to that used for conventional format 3/3A messages but where the message is masked using a distinct RNTI. Correspondingly, the wireless device is configured to recognize from the distinct RNTI that the received TPC commands are targeted to control the uplink transmit power used by the wireless device for SRS transmissions.

In an example method, an LTE base station is configured to independently control a transmit power of SRS transmissions by a wireless device in an LTE network by allocating a first RNTI to the wireless device that is distinct from any other RNTI allocated to the wireless device for TPC purposes. This first RNTI may be referred to as a TPC-SRS-RNTI, to denote its use in TPC of SRS transmissions by the targeted wireless device(s).

The method further includes generating SRS TPC commands for controlling the transmit power of the SRS transmissions by the wireless device, and sending the SRS TPC commands to the wireless device in modified DCI format 3/3A messages. As noted, these modified messages advantageously have the same size as standardized for format 3/3A DCI messages used for TPC of PUSCH and PUCCH transmissions by the wireless device, but they are masked by the TPC-SRS-RNTI.

In a corresponding device-side example, a wireless device is configured for operation in an LTE network and implements a method that includes receiving a modified DCI format 3/3A message from a base station in an LTE network, where the modified DCI format 3/3A message has the same size as standardized for format 3/3A DCI messages. The device-implemented method further includes recognizing the modified DCI format 3/3A message based on determining it is masked with a first RNTI that was previously allocated to the wireless device and is distinct from any other RNTI allocated to the wireless device for TPC purposes.

As above, the RNTI used to mask DCI messages targeted to SRS TPC may be referred to as a TPC-SRS-RNTI, and the device-side method additionally includes obtaining a TPC command from the modified DCI format 3/3A message. Further, based on obtaining the TPC command(s) from the received message, the method includes controlling a transmit power used for an SRS transmission by the wireless device, as a function of the TPC command obtained from the modified DCI format 3/3A message. Such operation allows separate TPC commands to be sent by the LTE network for SRS and PUSCH TPC, meaning that SRS TPC is advantageously decoupled from PUSCH and/or PUCCH TPC.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
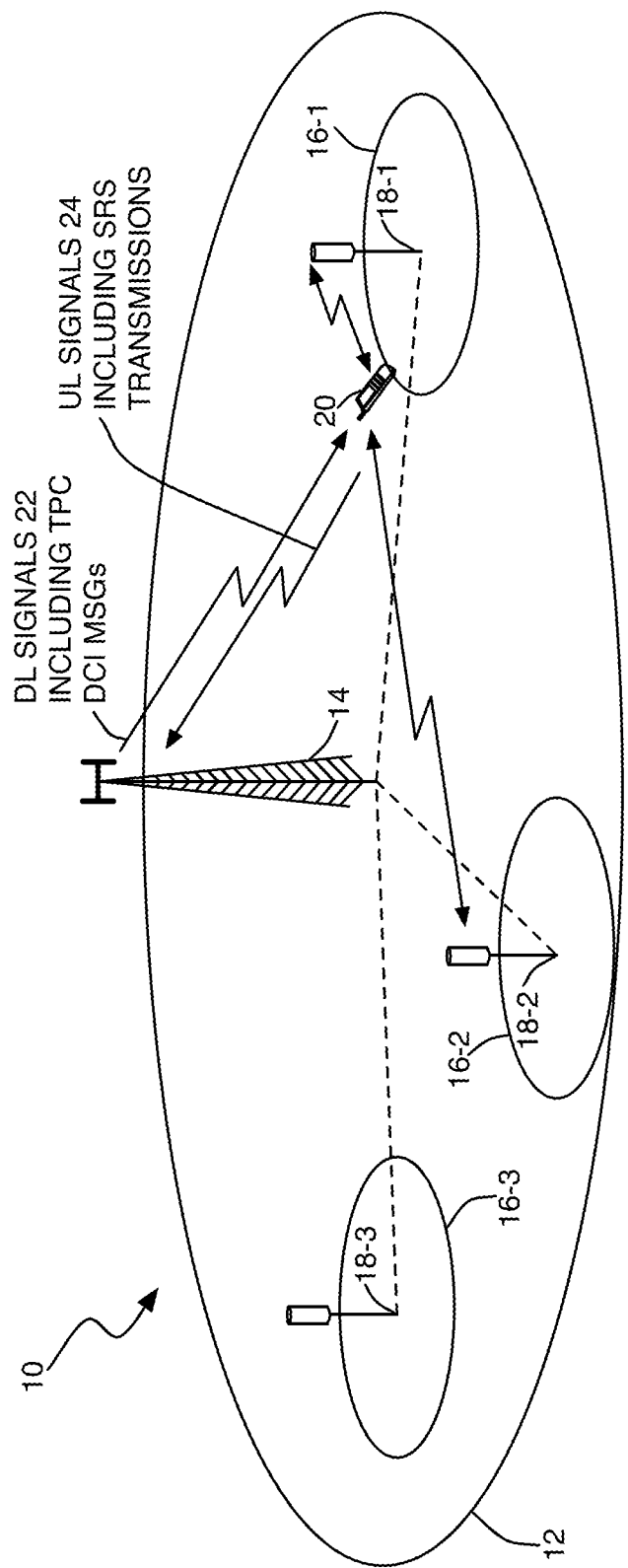
FIG. 1 is a block diagram of an example wireless communication network that includes embodiments of network base stations and wireless devices, as contemplated herein.

FIG. 1 is a block diagram of an example wireless communication network 10, e.g., an LTE network. The actual implementation of the network 10 may include more entities than illustrated and in general may have greater complexity;

however, the simplified depiction aids clarity of discussion with respect to the teachings herein.

In that regard, one sees that the network 10 comprises one or more cells 12 as provided by corresponding base stations 14 and/or cells 16 as provided by corresponding base stations 18. While the base stations 14 and 18 are not necessarily different in construction and/or operation, they may be. For example, in the illustrated configuration the base station 14 provides a "macro" cell 12 having a relatively large coverage area relative to the smaller, "micro" cells 16 provided by the base stations 18, e.g., the base station 18-1 provides the cell 16-1, the base station 18-2 provides the cell 16-2, and so on. In this regard, the cells 16 may overlay the cell 12 and provide high-data rate hotspots or otherwise provide for more reliable service in certain regions within the cell 12.

Unless the contextual usage denotes otherwise, the term "cell 12, 16" generically refers to one cell 12 or 16, and "cells 12, 16" generically refers to two or more cells 12, cells 16, or a mix of cells 12 and 16. The same logic holds when referring to base stations 14 and/or 18, e.g., for the terms "base station 14, 18" and "base stations 14, 18".

With the above in mind, one sees that one or more base stations 14, 18 send downlink signals 22 that include DCI messages conveying TPC commands, which messages are referred to in the diagram as "TPC DCI messages". Correspondingly, there are one or more wireless devices 20 operating within the network 10, and at least one of them is configured to send uplink signals 24 that include SRS transmissions which are power-controlled according to the teachings herein.

More particularly, in one aspect, this disclosure introduces a signaling scheme providing for the use of two separate closed-loop power control instances for SRS and PUSCH power adjustment, as compared to the current convention of using the same closed-loop power control for both SRS and PUSCH. The use of two independent loops for SRS and PUSCH power allows adjusting SRS and PUSCH with different criteria. Such operation offers a number of advantages, such as in heterogeneous networks—like that shown in the example of FIG. 1—because reception of PUSCH transmissions from a given UE or other wireless device 20 may be only needed at certain base stations 14, 18. Conversely, SRS reception from that same wireless device 20 may be needed at another or larger set of base stations 14, 18 due to the use of reciprocity-based transmission schemes. Reception of SRS transmissions at sufficient signal levels also may be useful for Coordinated MultiPoint, "CoMP", operation for transmission/reception point selection, mobility measurements, and other network-centric measurements. Here, those skilled in the art will recognize that CoMP arrangements provide wireless service for wireless devices 20 using a dynamically changing set or subset of base stations or other network access points within a coordinated cluster of such access points.

In order to allow for two independent closed-loop TPC instances for SRS and PUSCH, different TPC commands for PUSCH and SRS are sent to the UE according to the teachings herein. In this disclosure, differentiation between PUSCH and SRS TPC commands is achieved by defining a distinct RNTI for purposes of SRS TPC, and sending SRS TPC commands in modified DCI format 3/3A messages that are masked by the distinct RNTI. For example, modified DCI formats 3/3A are defined herein such that legacy wireless devices ignore any modified DCI format 3/3A messages received by them, while appropriately configured wireless devices 20 are able to decode and correctly interpret the modified format messages.

In an advantageous embodiment, the new modified DCI formats contemplated herein have the same structure and size as conventional DCI formats 3/3A, but they differ in the fact that they are associated with new unique RNTI for each wireless device 20, or group of such devices, for which independent SRS power control is employed. The new RNTIs are known or can be derived by the targeted wireless devices 20.

A given wireless device 20 recognizes the modified DCI format 3/3A messages based on detecting that a received DCI message has the same size as a conventional DCI format 3/3A message but is masked with the distinct RNTI that has been allocated for independent power control of the device's SRS transmissions. More generally, the modified DCI format 3/3A messages can be used to convey TPC commands that are interpreted as power control targeting any possible combination of SRS, PUSCH and PUCCH transmissions by the receiving wireless device 20. Explicit or implicit indicators and/or higher-layer signaling may be used to determine the interpretation of TPC commands conveyed in the modified DCI format 3/3A messages.

In other words, by transmitting DCI formats with the same size as formats 3/3A, but with a different RNTI, it is possible to individually power control SRS or PUSCH. If a DCI format with the same size and RNTI as 3/3A is received by the UE, such format is interpreted as a conventional power control command, as defined in the Rel-10 LTE specification. This approach enables backwards compatibility of DCI formats without increasing the number of blind decodes and complexity required to the UEs in order to detect DCI formats of different sizes.

Figure 2:
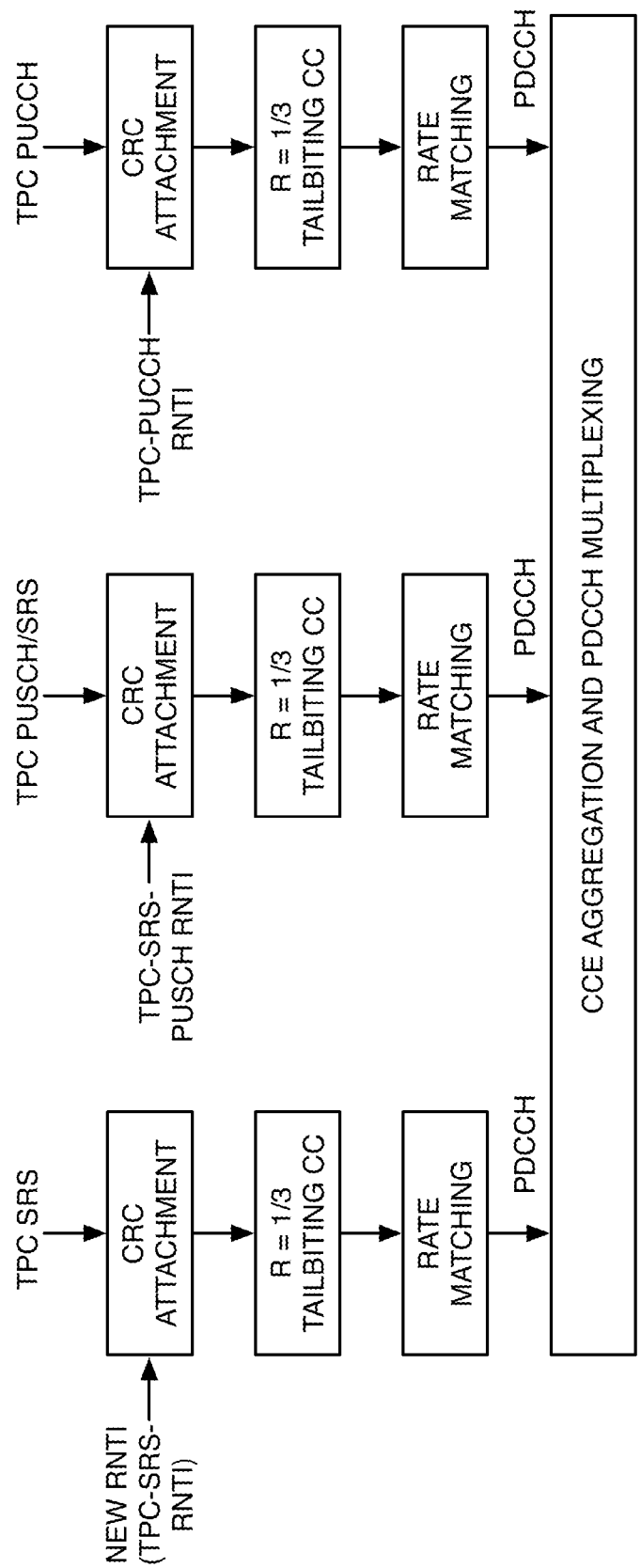
FIG. 2 is diagram of an example signaling structure for signaling TPC commands for SRS independently from signaling other TPC commands.

Correspondingly, FIG. 2 illustrates the use of a new TPC-SRS-RNTI for sending SRS TPC commands in modified DCI format 3/3A messages. These modified messages have the same size as standard DCI format 3/3A messages, which carry TPC commands for PUSCH or PUCCH, as shown in FIG. 2.

Figure 3:
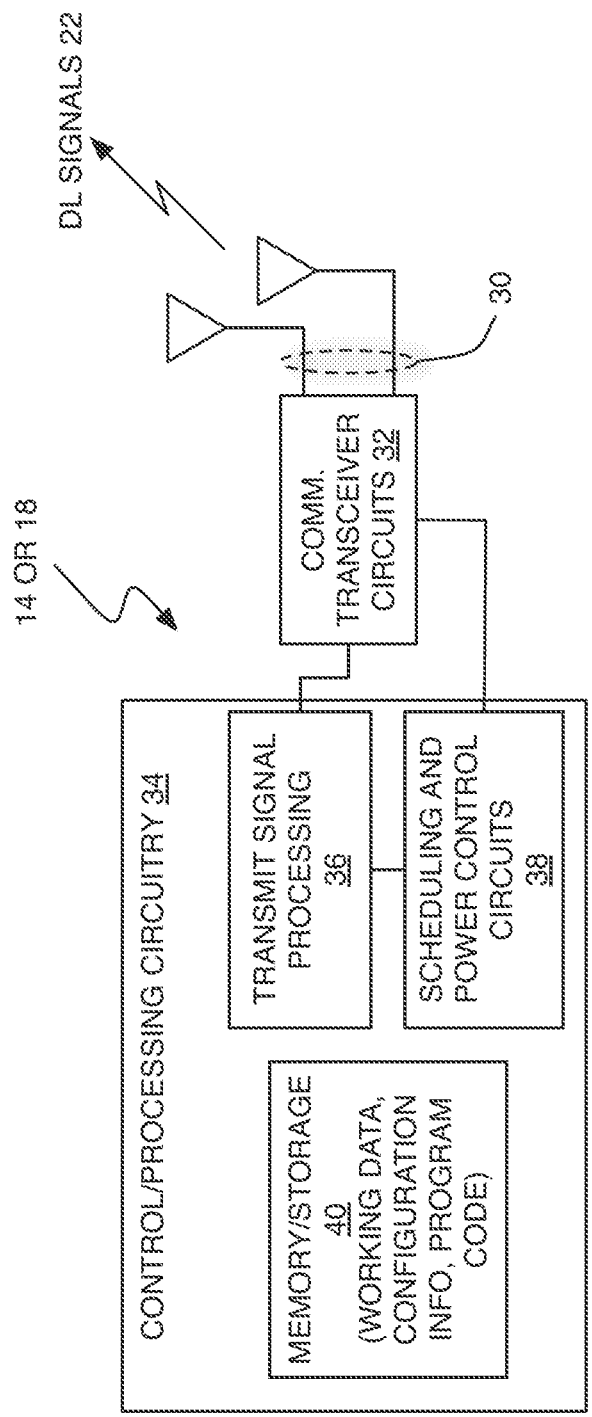
FIG. 3 is a block diagram of example details for one embodiment of a base station, such as introduced in FIG. 1.

FIG. 3 illustrates an example network node, e.g., one of the base stations 14, 18, which includes fixed and/or programmable circuitry that is configured to implement uplink power control for PUSCH, PUCCH and SRS transmissions as disclosed herein. The illustrated base station 14, 18 is configured for operation in an LTE network 10 and comprises communication transceiver circuits 32 that are configured to transmit downlink signals to a wireless device 20 operating in the network and receive uplink signals from the wireless device 20.

The base station 14, 18 further includes one or more processing circuits 34 that are operatively associated with the communication transceiver circuits 32 and configured to allocate a first RNTI to the wireless device 20 that is distinct from any other RNTI allocated to the wireless device 20 for TPC purposes. This first RNTI is referred to as a TPC-SRS-RNTI. The one or more processing circuits 34—referred to as "processing circuits 34" for simplicity—are further configured to generate SRS TPC commands for controlling the transmit power of the SRS transmissions by the wireless device 20, and to send the SRS TPC commands to the wireless device 20 in modified DCI format 3/3A messages. As noted, the modified DCI format 3/3A messages have a same size as standardized for format 3/3A DCI messages used for TPC of the PUCCH and PUSCH transmissions by the wireless device 20, but the modified DCI format 3/3A messages are masked by the TPC-SRS-RNTI.

Further, to retain PUSCH TPC functionality, the processing circuits 34 are configured to allocate a TPC-PUSCH-RNTI to the wireless device 20, generate PUSCH TPC commands independent of the SRS TPC commands, for controlling the transmit power of PUSCH transmissions by the wireless device 20, and send the PUSCH TPC commands in format 3/3A DCI messages that are masked by the TPC-PUSCH-RNTI.

In some embodiments, the processing circuits 34 are configured to use a shorter closed-loop TPC time offset for adjusting the SRS transmission power of the wireless device 20, as compared to that used for adjusting the PUSCH transmission power of the wireless device 20. In other words, there is a shorter delay between the transmission of an SRS TPC command and its application at the targeted wireless device 20, as compared to the delay between transmission of a PUSCH TPC command and its application at the targeted wireless device 20.

In some embodiments, the TPC-SRS-RNTI is a first TPC-SRS-RNTI among two or more TPC-SRS-RNTIs including at least a second TPC-SRS-RNTI. Here, the processing circuits 34 are configured to: allocate the first TPC-SRS-RNTI to the wireless device 20 for a first SRS configuration of the wireless device 20, and allocate the second TPC-SRS-RNTI to the wireless device 20 for a second SRS configuration of the wireless device 20. According to this arrangement, then, the processing circuits 34 generate first SRS TPC commands for the SRS transmissions by the wireless device 20 that are associated with the first SRS configuration and generate second SRS TPC commands for the SRS transmissions by the wireless device 20 that are associated with the second SRS configuration. The processing circuits 34 are further configured to send the first SRS TPC commands in modified DCI format 3/3A messages masked with the first TPC-SRS-RNTI and send the second SRS TPC commands in modified DCI format 3/3A messages masked with the second TPC-SRS-RNTI. It will be understood that the processing circuits 34 "send" via cooperation with the communication transceiver circuits 32. The processing circuits 34 in such embodiments also may be configured to configure the wireless device 20 to associate the first and second TPC-SRS-RNTIs with the first and second SRS configurations.

Implementation of the processing circuits 34 is subject to variation. In the diagram, the processing circuits 34 include a transmit signal processing circuit 36, scheduling and power control circuits 38, along with a memory or other storage element 40, which actually may comprise different memory circuits, e.g., volatile and non-volatile storage. The transmit signal processing circuits 36 may be configured to signal the SRS and other TPC commands, with those commands being generated by the scheduling and power control circuits 38.

The illustrated circuits may be may be at least partly implemented as functional circuits within digital processing circuitry, such as one or more microprocessors, microcontrollers, DSPs, FPGAs, etc. Thus, FIG. 3 generally labels the processing circuits 34 as "CONTROL/PROCESSING CIRCUITRY". In particular, the base station 14, 18 may include a chassis having one or more backplanes or other such interfaces that support different sets of installed processing cards that provide call control and signaling support for the various types of call/data connections provided via the LTE network 10. Such circuitry includes or is associated with memory/storage (one or more types of computer-readable medium) that stores a computer program comprising program instructions that cause the node to carry out at least a portion of the network-side power control method(s) taught herein, when those program instructions are executed by the processing circuits 34.

With this configuration, the example base station 14, 18 will be understood as implementing a method of power control including determining different/separate TPCs for controlling PUSCH and SRS transmissions by targeted wireless devices 20, and sending DCI messages according to a format/timing that enables the wireless device(s) 20 to process the DCI messages and extract the separate TPCs for controlling the transmit power(s) of SRS transmissions independently from PUSCH and/or PUCCH transmission. As such, the network 10 can be understood as implementing separate closed-loop Tx power control for one or more wireless devices 20, with respect to the SRS transmissions by those wireless devices 20.

Figure 4:
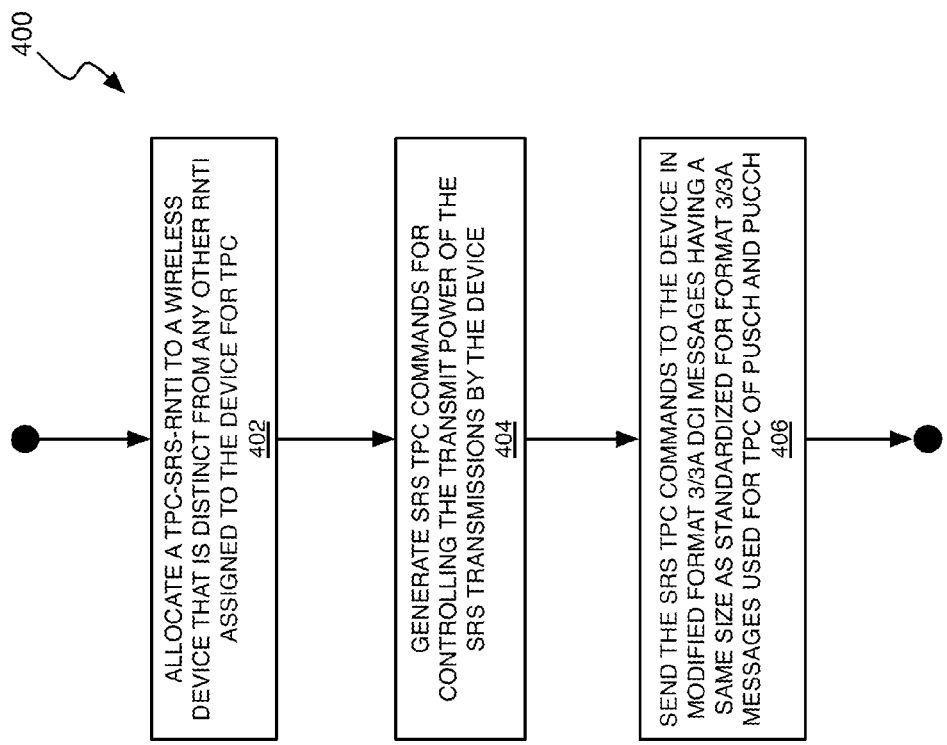
FIG. 4 is a logic flow diagram of one embodiment of a method of network-side processing for independent SRS TCP.

FIG. 4 illustrates an example of such a method 400. The method 400 includes allocating (Block 402) a first RNTI to the wireless device 20 that is distinct from any other RNTI allocated to the wireless device 20 for TPC purposes, which first RNTI is referred to as a TPC-SRS-RNTI.

The method 400 further includes generating (Block 404) SRS TPC commands for controlling the transmit power of the SRS transmissions by the wireless device 20, and sending (Block 406) the SRS TPC commands to the wireless device 20 in modified DCI format 3/3A messages. As previously explained, these modified DCI format 3/3A messages have the same size as standardized format 3/3A DCI messages used for TPC of PUSCH and PUCCH transmissions by the wireless device 20.

Figure 5:
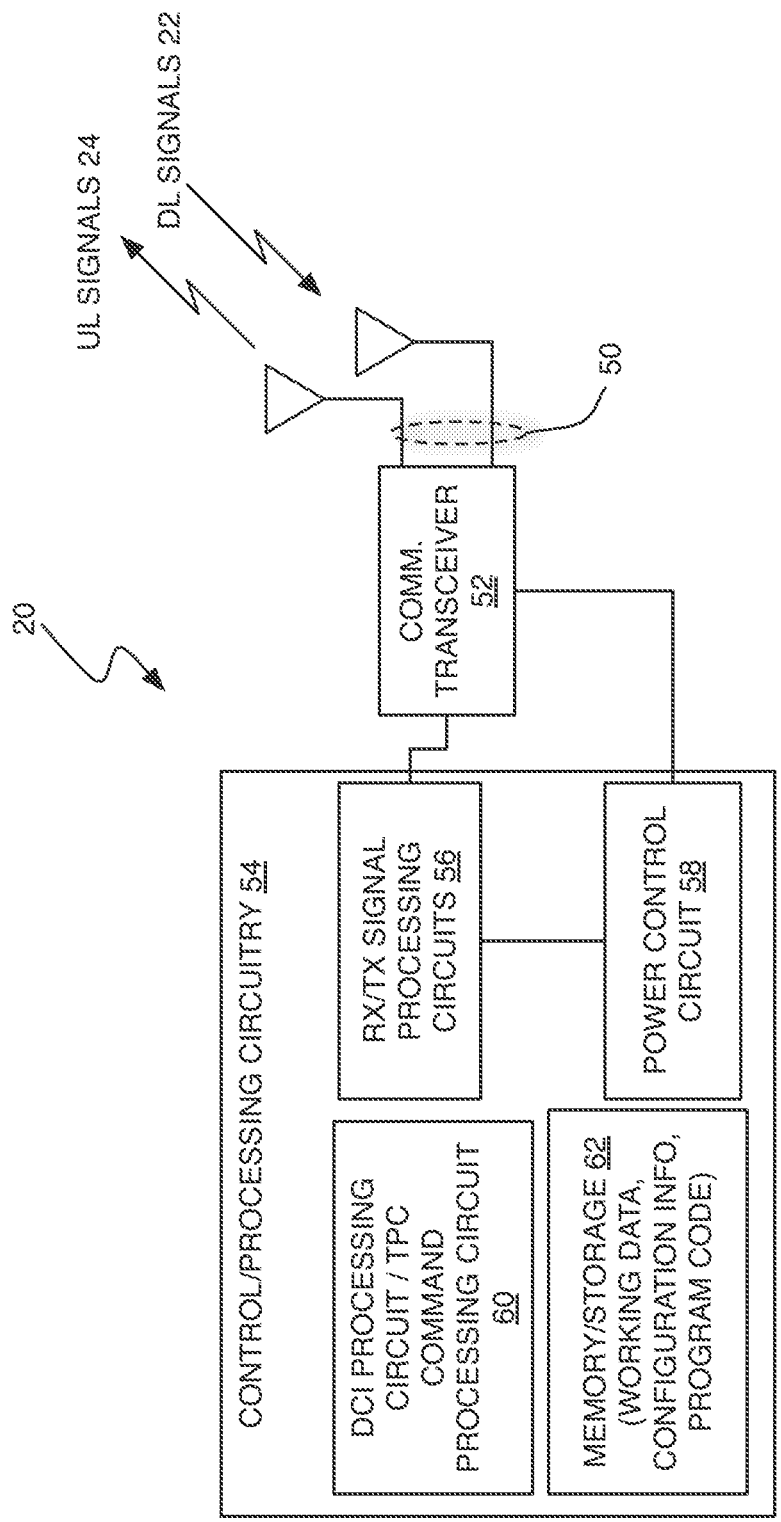
FIG. 5 is a block diagram of example details for one embodiment of a wireless device, such as introduced in FIG. 1.

As for an example of such a wireless device 20, FIG. 5 illustrates one embodiment. In the depicted arrangement, the wireless device 20 is configured for operation in an LTE network 10 and it comprises one or more transmit/receive antennas 50 and associated communication transceiver circuits 52 that are configured to receive downlink signals 22 from a base station 14, 18 in the LTE network 10 and to send uplink signals 24 to the base station 14, 18. Of course, the wireless device 20 may be able to send signals and/or receive signals 22, 24 from multiple base stations 14, 18.

The wireless device 20 further includes one or more processing circuits 54, which are operatively associated with the communication transceiver circuits 52 labeled as "CONTROL/PROCESSING CIRCUITRY" in the diagram and referred to hereafter simply as "processing circuits 54". The processing circuits 54 are configured to receive a modified DCI format 3/3A message from the base station 14, 18, wherein the modified DCI format 3/3A message has a same size as standardized for format 3/3A DCI messages, and to recognize the modified DCI format 3/3A message based on determining that the modified DCI format 3/3A message is masked with a first RNTI that was previously allocated to the wireless device 20.

The first RNTI is distinct from any other RNTI allocated to the wireless device 20 for TPC purposes and is referred to as a TPC-SRS-RNTI. Accordingly, the processing circuits 54 are further configured to obtain a TPC command from the modified DCI format 3/3A message, and to control a transmit power used for a SRS transmission by the wireless device 20, as a function of the TPC command obtained from the modified DCI format 3/3A message.

In at least some embodiments, the processing circuits 54 are also configured to receive a format 3/3A DCI message, determine that the format 3/3A DCI message is masked with a TPC-PUSCH-RNTI previously allocated to the wireless device 20 for TPC of PUSCH transmissions by the wireless device 20, obtain a TPC command from the format 3/3A DCI message, and control the transmit power used for a PUSCH transmission by the wireless device 20, as a function of the TPC command obtained from the format 3/3A DCI message. Likewise, the processing circuits 54 may be further configured to receive format 3/3A DCI messages that are masked with a TPC-PUCCH-RNTI, and to control a transmit power of PUCCH transmissions by the wireless device 20 responsive to TPC commands obtained from such messages.

The processing circuits 54 also may be configured to use a shorter closed-loop TPC time offset for adjusting the SRS transmission power responsive to the TPC command obtained from the modified DCI format 3/3A message, as compared to that used for adjusting the PUSCH transmission power of the wireless device 20 responsive to a TPC command obtained from a corresponding format 3/3A DCI message.

Still further, in one or more embodiments, the TPC-SRS-RNTI is a first TPC-SRS-RNTI among two or more TPC-SRS-RNTIs allocated to the wireless device 20, including at least a second TPC-SRS-RNTI. Here, the processing circuits 54 are configured to: receive first modified DCI format 3/3A messages masked by the first TPC-SRS-RNTI and second modified DCI format 3/3A messages masked by the second TPC-SRS-RNTI, obtain first TPC commands from the first modified DCI format 3/3A messages and second TPC commands from the second modified DCI format 3/3A messages, and control the transmit power used for first SRS transmissions by the wireless device 20, as a function of the first TPC commands, and control the transmit power used for second SRS transmissions by the wireless device 20, as a function of the second TPC commands.

The first and second SRS transmissions are associated with first and second SRS configurations of the wireless device 20, and this arrangement thus provides for separate power control of SRS transmissions for different SRS configurations. Complementing such control, the processing circuits 54 are configured to receive configuration signaling from the LTE network 10, which indicates the allocation of the first and second TPC-SRS-RNTIs to the wireless device 20, and the mapping of the first TPC-SRS RNTI to the first SRS configuration and the second TPC-SRS-RNTI to the second SRS configuration.

As with the base station 14, 18, the arrangement depicted for the wireless device 20 in FIG. 5 is a non-limiting example provided for purposes of illustration and discussion. The depicted processing circuits 54 include a number of circuit elements or processing units, which may comprise dedicated circuit elements or functional circuit elements implemented via programmed digital processing circuits. In any case, the example circuits include: receive/transmit, "RX/TX", signal processing circuits 56, which provide received signal and transmitted signal processing, such as demodulation and decoding in the receive direction and modulation and encoding in the transmit direction; a power control circuit 58 for controlling transmit power, e.g., per transmission type or channel, for control of SRS, PUSCH, and PUCCH transmit power(s); and a TPC command processing circuit 60, which may be integrated or associated with a DCI processing circuit 30 that is configured to detect/decode incoming DCI messages and, e.g., provide extracted TPC commands to the TPC command processing circuit 60, which in turn communicates with the power control circuit 58.

The processing circuits 54 further include or are associated with one or more memory circuits or other storage elements, generically referred to as "memory/storage 62". In at least one embodiment, the processing circuits 54 are programmable circuits, e.g., one or more microprocessors, microcontrollers, DSPs, FPGAs, ASICs, or other such digital processing circuitry, which execute stored computer program instructions. Correspondingly, the memory/storage 62 may include volatile and non-volatile storage and comprises at least one computer-readable medium storing computer program instructions for execution by the processing circuits 54. It will be understood that the execution of such program instructions configure the processing circuits 54 to implement the device-side processing method(s) taught herein.

Figure 6:
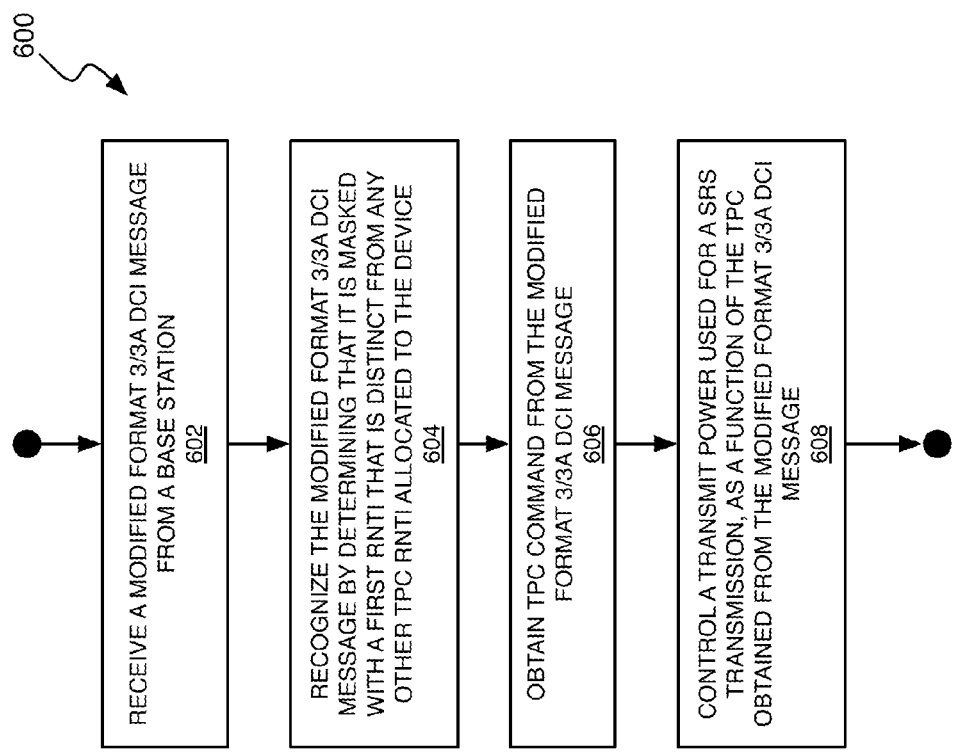
FIG. 6 is a block diagram of one embodiment of a method of device-side processing for independent SRS TCP.

FIG. 6 illustrates an example method 600 as is implemented in the wireless device 20 in some embodiments. The method 600 includes receiving (Block 602) a modified DCI format 3/3A message from a base station 14, 18 in the LTE network 10, wherein the modified DCI format 3/3A message has a same size as standardized for format 3/3A DCI messages and recognizing (Block 604) the modified DCI format 3/3A message based on determining that the modified DCI format 3/3A message is masked with a first RNTI that was previously allocated to the wireless device 20.

This first RNTI is distinct from any other RNTI allocated to the wireless device 20 for TPC purposes and is referred to as a TPC-SRS-RNTI, denoting its usage, e.g., for sending SRS TPC commands separate from TPC commands that may be sent for transmit power control of PUSCH and/or PUCCH transmissions by the wireless device 20, using respective PUSCH and/or PUCCH RNTIs.

Of course, it is also contemplated herein that the network 10 may "map" the TPC commands sent by it using the TPC-SRS-RNTI to any combination of SRS, PUSCH and PUCCH power control. For example, the network 10 may send signaling, e.g., higher-layer signaling, indicating a mapping or rule that determines how the wireless device 20 should interpret and apply the TPC commands received via modified DCI format 3/3A messages masked with the SRS-TPC-RNTI. In such embodiments, the SRS TPC commands conveyed in the modified DCI format 3/3A messages are generated by the network 10 in view of the particular combination of transmissions to be controlled at the targeted wireless device(s) 20, and the targeted wireless device(s) 20 are configured to apply the received SRS TPC commands to the indicated combination of SRS, PUSCH and PUCCH transmissions. The mapping or rule used to control how the wireless device(s) 20 interpret the SRS TPC commands sent in the modified DCI format 3/3A messages can be signaled via RRC signaling, for example.

In any case, the method 600 further includes obtaining (Block 606) a TPC command from the modified DCI format 3/3A message and controlling (Block 608) a transmit power used for a SRS transmission by the wireless device 20, as a function of the TPC command obtained from the modified DCI format 3/3A message.

Broadly, then, in some embodiments, when a modified DCI format 3/3A message is decoded at the wireless device 20, each power control field included in the DCI format is interpreted as either a power control command for PUSCH, PUCCH, SRS, or any combination of them. Individual different mappings of the power control fields to combinations of the mentioned channels and signals are possible for each power control field and/or for each target wireless communication device 20. The specific mapping may be signaled by the network to the targeted wireless devices 20 using, e.g., semi-static RRC signaling.

In at least one embodiment, however, the SRS-TPC-RNTI contemplated herein logically maps to the SRS transmissions by a targeted wireless device 20, so that the wireless network 10 generates TPC commands for controlling the uplink transmit power of SRS transmissions by the wireless device 20 and conveys those TPC commands in modified DCI format 3/3A messages sent to the targeted wireless device (20), where those messages are masked by the SRS-TPC-RNTI—e.g., the message CRC is computed in dependence on the SRS-TPC-RNTI. In turn, the targeted wireless device 20 decodes such messages and controls its uplink transmit power for SRS transmissions responsive to the TPC commands decoded from such messages.

It may be that these modified messages are decodable only by newer wireless devices 20 that are configured according to LTE Release 11. Older, legacy devices would simply ignore such messages and this arrangement allows the network 10 to retain conventional power control of SRS, PUSCH and PUCCH transmissions by legacy devices, while employing the new power control taught herein for wireless devices 20 that are configured to support the new control.

Among the several advantages that stem from such control, it is recognized herein that use of the SRS-TPC-RNTI and the attendant generation and signaling of TPC commands in modified DCI format 3/3A messages masked by that RNTI allow the network 10 to de-couple the closed loop TPC of PUSCH and SRS transmissions by a targeted wireless device 20. In turn, this capability allows the use of reciprocity based transmission schemes in the network 10, which require SRS to be measured at all base stations 14, 18 within a cell 12, 16, while PUSCH transmit power can be reduced, e.g., for reception only at base station(s) 14, 18 relatively close to the wireless device 20.

What is claimed is:

1. A method of independently controlling the transmit power of Sounding Reference Signal (SRS) transmissions by a wireless device operating in a Long Term Evolution (LTE) network, said method implemented at a base station in the LTE network and comprising:
    allocating a first Radio Network Temporary Identifier (RNTI) to the wireless device that is distinct from any other RNTI allocated to the wireless device for Transmit Power Control (TPC) purposes, said first RNTI referred to as a TPC-SRS-RNTI;
    generating SRS TPC commands for controlling the transmit power of the SRS transmissions by the wireless device; and
    sending the SRS TPC commands to the wireless device in modified format 3/3A Downlink Control Information (DCI) messages, wherein the modified DCI format 3/3A messages have the same size as standardized for format 3/3A DCI messages used for TPC of Physical Uplink Shared Channel (PUSCH) and Physical Uplink Control Channel (PUCCH) transmissions by the wireless device, but wherein the modified DCI format 3/3A messages are masked by the TPC-SRS-RNTI; and
    using a shorter closed-loop TPC time offset for adjusting the SRS transmission power of the wireless device, as compared to that used for adjusting the PUSCH transmission power of the wireless device.

2. A method of independently controlling the transmit power of Sounding Reference Signal (SRS) transmissions by a wireless device operating in a Long Term Evolution (LTE) network, said method implemented at a base station in the LTE network and comprising:
    allocating a first Radio Network Temporary Identifier (RNTI) to the wireless device that is distinct from any other RNTI allocated to the wireless device for Transmit Power Control (TPC) purposes, said first RNTI referred to as a TPC-SRS-RNTI;
    generating SRS TPC commands for controlling the transmit power of the SRS transmissions by the wireless device; and
    sending the SRS TPC commands to the wireless device in modified format 3/3A Downlink Control Information (DCI) messages, wherein the modified DCI format 3/3A messages have the same size as standardized for format 3/3A DCI messages used for TPC of Physical Uplink Shared Channel (PUSCH) and Physical Uplink Control Channel (PUCCH) transmissions by the wireless device, but wherein the modified DCI format 3/3A messages are masked by the TPC-SRS-RNTI;
    wherein the TPC-SRS-RNTI is a first TPC-SRS-RNTI among two or more TPC-SRS-RNTIs including at least a second TPC-SRS-RNTI,
    wherein said step of allocating includes allocating the first TPC-SRS-RNTI to the wireless device for a first SRS configuration of the wireless device and allocating the second TPC-SRS-RNTI to the wireless device for a second SRS configuration of the wireless device,
    wherein said step of generating comprises generating first SRS TPC commands for the SRS transmissions by the wireless device that are associated with the first SRS configuration and generating second SRS TPC commands for the SRS transmissions by the wireless device that are associated with the second SRS configuration, and
    wherein said step of sending comprises sending the first SRS TPC commands in modified DCI format 3/3A messages masked with the first TPC-SRS-RNTI and sending the second SRS TPC commands in modified DCI format 3/3A messages masked with the second TPC-SRS-RNTI.

3. The method of claim 2, further comprising configuring the wireless device to associate the first and second TPC-SRS-RNTIs with the first and second SRS configurations.

4. The method of claim 2, further comprising allocating a TPC-PUSCH-RNTI to the wireless device, generating PUSCH TPC commands independent of the SRS TPC commands, for controlling the transmit power of PUSCH transmissions by the wireless device, and sending the PUSCH TPC commands in format 3/3A DCI messages that are masked by the TPC-PUSCH-RNTI.

5. A method of independently controlling the transmit power of Sounding Reference Signal (SRS) transmissions by a wireless device operating in a Long Term Evolution (LTE) network, said method implemented at a base station in the LTE network and comprising:
    allocating a first Radio Network Temporary Identifier (RNTI) to the wireless device that is distinct from any other RNTI allocated to the wireless device for Transmit Power Control (TPC) purposes, said first RNTI referred to as a TPC-SRS-RNTI;
    generating a TPC command for controlling a selected combination of SRS, Physical Uplink Shared Channel (PUSCH), and Physical Uplink Control Channel (PUCCH) transmission power;
    sending the TPC command to the wireless device in a modified format 3/3A Downlink Control Information (DCI) message, wherein the modified DCI format 3/3A message has the same size as standardized for format 3/3A DCI messages used for TPC of PUSCH and PUCCH transmissions by the wireless device, but wherein the modified DCI format 3/3A messages are masked by the TPC-SRS-RNTI; and signaling mapping or rule information to the wireless device indicating the selected combination of SRS, PUSCH, and PUCCH transmission power to which the wireless device is to apply the TPC command.

6. A base station configured for operation in a Long Term Evolution (LTE) network, said base station comprising:
communication transceiver circuits configured to transmit downlink signals to a wireless device operating in the LTE network and receive uplink signals from the wireless device; and
one or more processing circuits operatively associated with the communication transceiver circuits and configured to:
allocate a first Radio Network Temporary Identifier (RNTI) to the wireless device that is distinct from any other RNTI allocated to the wireless device for Transmit Power Control (TPC) purposes, said first RNTI referred to as a TPC-SRS-RNTI;
generate Sounding Reference Signal (SRS) TPC commands for controlling the transmit power of the SRS transmissions by the wireless device; and
send the SRS TPC commands to the wireless device in modified format 3/3A Downlink Control Information (DCI) messages, wherein the modified DCI format 3/3A messages have the same size as standardized for format 3/3A DCI messages used for TPC of Physical Uplink Shared Channel (PUSCH) and Physical Uplink Control Channel (PUCCH) transmissions by the wireless device, but wherein the modified DCI format 3/3A messages are masked by the TPC-SRS-RNTI;
wherein the one or more processing circuits are configured to use a shorter closed-loop TPC time offset for adjusting the SRS transmission power of the wireless device, as compared to that used for adjusting the PUSCH transmission power of the wireless device.

7. A base station configured for operation in a Long Term Evolution (LTE) network, said base station comprising:
communication transceiver circuits configured to transmit downlink signals to a wireless device operating in the LTE network and receive uplink signals from the wireless device; and
one or more processing circuits operatively associated with the communication transceiver circuits and configured to:
allocate a first Radio Network Temporary Identifier (RNTI) to the wireless device that is distinct from any other RNTI allocated to the wireless device for Transmit Power Control (TPC) purposes, said first RNTI referred to as a TPC-SRS-RNTI;
generate Sounding Reference Signal (SRS) TPC commands for controlling the transmit power of the SRS transmissions by the wireless device; and
send the SRS TPC commands to the wireless device in modified format 3/3A Downlink Control Information (DCI) messages, wherein the modified DCI format 3/3A messages have the same size as standardized for format 3/3A DCI messages used for TPC of Physical Uplink Shared Channel (PUSCH) and Physical Uplink Control Channel (PUCCH) transmissions by the wireless device, but wherein the modified DCI format 3/3A messages are masked by the TPC-SRS-RNTI;
wherein the TPC-SRS-RNTI is a first TPC-SRS-RNTI among two or more TPC-SRS-RNTIs including at least a second TPC-SRS-RNTI, and wherein the one or more processing circuits are configured to:
allocate the first TPC-SRS-RNTI to the wireless device for a first SRS configuration of the wireless device, and allocate the second TPC-SRS-RNTI to the wireless device for a second SRS configuration of the wireless device;
generate first SRS TPC commands for the SRS transmissions by the wireless device that are associated with the first SRS configuration and generate second SRS TPC commands for the SRS transmissions by the wireless device that are associated with the second SRS configuration; and
send the first SRS TPC commands in modified DCI format 3/3A messages masked with the first TPC-SRS-RNTI and send the second SRS TPC commands in modified DCI format 3/3A messages masked with the second TPC-SRS-RNTI.

8. The base station of claim 7, wherein the one or more processing circuits are configured to configure the wireless device to associate the first and second TPC-SRS-RNTIs with the first and second SRS configurations.

9. The base station of claim 7, wherein the one or more processing circuits are configured to allocate a TPC-PUSCH-RNTI to the wireless device, generate PUSCH TPC commands independent of the SRS TPC commands, for controlling the transmit power of PUSCH transmissions by the wireless device, and send the PUSCH TPC commands in format 3/3A DCI messages that are masked by the TPC-PUSCH-RNTI.

10. A base station configured for operation in a Long Term Evolution (LTE) network, said base station comprising:
communication transceiver circuits configured to transmit downlink signals to a wireless device operating in the LTE network and receive uplink signals from the wireless device; and
one or more processing circuits operatively associated with the communication transceiver circuits and configured to:
allocate a first Radio Network Temporary Identifier (RNTI) to the wireless device that is distinct from any other RNTI allocated to the wireless device for Transmit Power Control (TPC) purposes, said first RNTI referred to as a TPC-SRS-RNTI;
generate a TPC command for controlling a selected combination of SRS, Physical Uplink Shared Channel (PUSCH), and Physical Uplink Control Channel (PUCCH) transmission power;
send the TPC command to the wireless device in a modified format 3/3A Downlink Control Information (DCI) message, wherein the modified DCI format 3/3A message has the same size as standardized for format 3/3A DCI messages used for TPC of PUSCH and PUCCH transmissions by the wireless device, but wherein the modified DCI format 3/3A messages are masked by the TPC-SRS-RNTI; and
signal mapping or rule information to the wireless device indicating the selected combination of SRS, PUSCH, and PUCCH transmission power to which the wireless device is to apply the TPC command.

11. A method at a wireless device configured for operation in a Long Term Evolution (LTE) network, said method comprising:
receiving a modified Downlink Control Information (DCI) format 3/3A message from a base station in the LTE network, wherein the modified DCI format 3/3A message has a same size as standardized for DCI format 3/3A messages;

recognizing the modified DCI format 3/3A message based on determining that the modified DCI format 3/3A message is masked with a first Radio Network Temporary Identifier (RNTI) that was previously allocated to the wireless device, where the first RNTI is distinct from any other RNTI allocated to the wireless device for Transmit Power Control (TPC) purposes and is referred to as a TPC-SRS-RNTI;

obtaining a TPC command from the modified DCI format 3/3A message;

controlling the transmit power used for a Sounding Reference Signal (SRS) transmission by the wireless device, as a function of the TPC command obtained from the modified DCI format 3/3A message;

using a shorter closed-loop TPC time offset for adjusting the SRS transmission power responsive to the TPC command obtained from the modified DCI format 3/3A message, as compared to that used for adjusting the PUSCH transmission power of the wireless device responsive to the TPC command obtained from the format 3/3A DCI message.

12. A method at a wireless device configured for operation in a Long Term Evolution (LTE) network, said method comprising:

receiving a modified Downlink Control Information (DCI) format 3/3A message from a base station in the LTE network, wherein the modified DCI format 3/3A message has a same size as standardized for DCI format 3/3A messages;

recognizing the modified DCI format 3/3A message based on determining that the modified DCI format 3/3A message is masked with a first Radio Network Temporary Identifier (RNTI) that was previously allocated to the wireless device, where the first RNTI is distinct from any other RNTI allocated to the wireless device for Transmit Power Control (TPC) purposes and is referred to as a TPC-SRS-RNTI;

obtaining a TPC command from the modified DCI format 3/3A message; and controlling the transmit power used for a Sounding Reference Signal (SRS) transmission by the wireless device, as a function of the TPC command obtained from the modified DCI format 3/3A message;

wherein the TPC-SRS-RNTI is a first TPC-SRS-RNTI among two or more TPC-SRS-RNTIs allocated to the wireless device, including at least a second TPC-SRS-RNTI, and wherein:

said step of receiving comprises receiving first modified DCI format 3/3A messages masked by the first TPC-SRS-RNTI and second modified DCI format 3/3A messages masked by the second TPC-SRS-RNTI;

said step of obtaining comprises obtaining first TPC commands from the first modified DCI format 3/3A messages and second TPC commands from the second modified DCI format 3/3A messages; and said step of controlling comprises controlling the transmit power used for first SRS transmissions by the wireless device, as a function of the first TPC commands, controlling the transmit power used for second SRS transmissions by the wireless device, as a function of the second TPC commands; and wherein the first and second SRS transmissions are associated with first and second SRS configurations of the wireless device.

13. The method of claim 12, further comprising receiving configuration signaling from the LTE network indicating the allocation of the first and second TPC-SRS-RNTIs to the wireless device, and the mapping of the first TPC-SRS RNTI to the first SRS configuration and the second TPC-SRS-RNTI to the second SRS configuration.

14. The method of claim 12, further comprising receiving a format 3/3A DCI message, determining that the format 3/3A DCI message is masked with a TPC-PUSCH-RNTI previously allocated to the wireless device for TPC of Physical Uplink Shared Channel (PUSCH) transmissions by the wireless device, obtaining a TPC command from the format 3/3A DCI message, and controlling the transmit power used for a PUSCH transmission by the wireless device, as a function of the TPC command obtained from the format 3/3A DCI message.

15. A method at a wireless device configured for operation in a Long Term Evolution (LTE) network, said method comprising:

receiving a modified Downlink Control Information (DCI) format 3/3A message from a base station in the LTE network, wherein the modified DCI format 3/3A message has a same size as standardized for DCI format 3/3A messages;

recognizing the modified DCI format 3/3A message based on determining that the modified DCI format 3/3A message is masked with a first Radio Network Temporary Identifier (RNTI) that was previously allocated to the wireless device, where the first RNTI is distinct from any other RNTI allocated to the wireless device for Transmit Power Control (TPC) purposes and is referred to as a TPC-SRS-RNTI;

obtaining a TPC command from the modified DCI format 3/3A message;

controlling a selected combination of Sounding Reference Signal (SRS), Physical Uplink Shared Channel (PUSCH), and Physical Uplink Control Channel (PUCCH) transmission power, according to the TPC command; and receiving mapping or rule information from the base station indicating the selected combination of SRS, PUSCH, and PUCCH transmission power to which the wireless device is to apply the TPC command.

16. A wireless device configured for operation in a Long Term Evolution (LTE) network, said wireless device comprising:

communication transceiver circuits configured to receive downlink signals from a base station in the LTE network and to send uplink signals to the base station; and one or more processing circuits operatively associated with the communication transceiver circuits and configured to:

receive a modified format 3/3A Downlink Control Information (DCI) message from a base station in the LTE network, wherein the modified DCI format 3/3A message has the same size as standardized for format 3/3A DCI messages;

recognize the modified DCI format 3/3A message based on determining that the modified DCI format 3/3A message is masked with a first Radio Network Temporary Identifier (RNTI) that was previously allocated to the wireless device, where the first RNTI is distinct from any other RNTI allocated to the wireless device for Transmit Power Control (TPC) purposes and is referred to as a TPC-SRS-RNTI;

obtain a TPC command from the modified DCI format 3/3A message; and control the transmit power used for a Sounding Reference Signal (SRS) transmission by the wireless device, as a function of the TPC command obtained from the modified DCI format 3/3A message;

wherein the one or more processing circuits are configured to use a shorter closed-loop TPC time offset for adjusting the SRS transmission power responsive to the TPC command obtained from the modified DCI format 3/3A message, as compared to that used for adjusting the PUSCH transmission power of the wireless device responsive to the TPC command obtained from the format 3/3A DCI message.

17. A wireless device configured for operation in a Long Term Evolution (LTE) network, said wireless device comprising:

communication transceiver circuits configured to receive downlink signals from a base station in the LTE network and to send uplink signals to the base station; and one or more processing circuits operatively associated with the communication transceiver circuits and configured to:

receive a modified format 3/3A Downlink Control Information (DCI) message from a base station in the LTE network, wherein the modified DCI format 3/3A message has the same size as standardized for format 3/3A DCI messages;

recognize the modified DCI format 3/3A message based on determining that the modified DCI format 3/3A message is masked with a first Radio Network Temporary Identifier (RNTI) that was previously allocated to the wireless device, where the first RNTI is distinct from any other RNTI allocated to the wireless device for Transmit Power Control (TPC) purposes and is referred to as a TPC-SRS-RNTI;

obtain a TPC command from the modified DCI format 3/3A message; and control the transmit power used for a Sounding Reference Signal (SRS) transmission by the wireless device, as a function of the TPC command obtained from the modified DCI format 3/3A message;

wherein the TPC-SRS-RNTI is a first TPC-SRS-RNTI among two or more TPC-SRS-RNTIs allocated to the wireless device, including at least a second TPC-SRS-RNTI, and wherein the one or more processing circuits are configured to:

receive first modified DCI format 3/3A messages masked by the first TPC-SRS-RNTI and second modified DCI format 3/3A messages masked by the second TPC-SRS-RNTI;

obtain first TPC commands from the first modified DCI format 3/3A messages and second TPC commands from the second modified DCI format 3/3A messages; and control the transmit power used for first SRS transmissions by the wireless device, as a function of the first TPC commands, and control the transmit power used for second SRS transmissions by the wireless device, as a function of the second TPC commands;

wherein the first and second SRS transmissions are associated with first and second SRS configurations of the wireless device.

18. The wireless device of claim 17, wherein the one or more processing circuits are configured to receive configuration signaling from the LTE network indicating the allocation of the first and second TPC-SRS-RNTIs to the wireless device, and the mapping of the first TPC-SRS RNTI to the first SRS configuration and the second TPC-SRS-RNTI to the second SRS configuration.

19. The wireless device of claim 17, wherein the one or more processing circuits are configured to receive a format 3/3A DCI message, determine that the format 3/3A DCI message is masked with a TPC-PUSCH-RNTI previously allocated to the wireless device for TPC of Physical Uplink Shared Channel (PUSCH) transmissions by the wireless device, obtain a TPC command from the format 3/3A DCI message, and control the transmit power used for a PUSCH transmission by the wireless device, as a function of the TPC command obtained from the format 3/3A DCI message.

20. A wireless device configured for operation in a Long Term Evolution (LTE) network, said wireless device comprising:

communication transceiver circuits configured to receive downlink signals from a base station in the LTE network and to send uplink signals to the base station; and one or more processing circuits operatively associated with the communication transceiver circuits and configured to:

receive a modified format 3/3A Downlink Control Information (DCI) message from a base station in the LTE network, wherein the modified DCI format 3/3A message has the same size as standardized for format 3/3A DCI messages;

recognize the modified DCI format 3/3A message based on determining that the modified DCI format 3/3A message is masked with a first Radio Network Temporary Identifier (RNTI) that was previously allocated to the wireless device, where the first RNTI is distinct from any other RNTI allocated to the wireless device for Transmit Power Control (TPC) purposes and is referred to as a TPC-SRS-RNTI;

obtain a TPC command from the modified DCI format 3/3A message;

control a selected combination of Sounding Reference Signal (SRS), Physical Uplink Shared Channel (PUSCH), and Physical Uplink Control Channel (PUCCH) transmission power, according to the TPC command;

receive mapping or rule information from the base station indicating the selected combination of SRS, PUSCH, and PUCCH transmission power to which the wireless device is to apply the TPC command.

* * * * *